United States Patent [19]

Lawrence

[11] Patent Number: 4,639,007
[45] Date of Patent: Jan. 27, 1987

[54] EXERCISE VEHICLE

[75] Inventor: Donald R. Lawrence, Tempe, Ariz.

[73] Assignee: Fred W. Wagenhals, Tempe, Ariz.

[21] Appl. No.: 777,919

[22] Filed: Sep. 19, 1985

[51] Int. Cl.[4] .................................................. B62M 1/12
[52] U.S. Cl. ...................................... 280/234; 272/73;
280/233; 280/244
[58] Field of Search ............... 280/233, 234, 235, 230,
280/232, 224, 242 R, 244, 246; 185/40 H;
272/73

[56] References Cited

U.S. PATENT DOCUMENTS

| | | | |
|---|---|---|---|
| 538,482 | 4/1895 | Doan | 280/233 |
| 642,544 | 1/1900 | Burbank | 280/240 |
| 1,020,432 | 3/1912 | McBarnes | 280/234 |
| 1,368,066 | 2/1921 | Starr | 280/240 |
| 1,620,926 | 3/1927 | Trullinger | 280/234 |
| 2,012,683 | 8/1935 | Johnson | 280/220 |
| 2,861,814 | 11/1958 | Rebhun | 280/251 |
| 3,498,634 | 3/1970 | Sheldon | 280/212 |
| 3,760,905 | 9/1973 | Dower | 280/233 |
| 3,895,825 | 7/1975 | Sink | 280/234 |
| 3,979,135 | 9/1976 | Meritzis | 280/226 R |
| 4,047,715 | 9/1977 | Gjessing | 272/132 |
| 4,305,600 | 12/1981 | Mendez | 280/226 R |
| 4,396,188 | 8/1983 | Dreissigacker et al. | 272/72 |
| 4,437,677 | 3/1984 | Ksayian | 280/234 |
| 4,508,358 | 4/1985 | Erel | 280/233 |

FOREIGN PATENT DOCUMENTS 340353 5/1936 Italy .................................... 280/234

*Primary Examiner*—John J. Love
*Assistant Examiner*—Everett G. Diederiks, Jr.
*Attorney, Agent, or Firm*—Charles E. Cates; Victor Myer

[57] ABSTRACT

An exercise vehicle is provided where foot actuated pedals caused the vehicle to move forward by means of a one-way clutch and hand operated pulling motions may be utilized likewise by means of a one-way clutch to move the vehicle forward, the hand operated mechanism being part of an extensible steering column so that as the operator leans forward and moves back and extends or retracts his arms the steering column will lengthen or shorten as required. Irrespective of the position of the hand operated bar the front wheels may be rotated by rotating the hand operating bar.

8 Claims, 5 Drawing Figures

EXERCISE VEHICLE

BACKGROUND OF THE INVENTION

This invention relates to exercise vehicles somewhat in the form of a go-cart wherein both the arms and the legs of the user may be exercised, or if desired, either the legs or the arms separately may be exercised along with the other bodily muscles and it is an object of the invention to provide an improved exercise vehicle of this nature.

The simulation is that of rowing a boat wherein the leg muscles, arm muscles and back muscles are extensively used. However, this may be achieved according to the invention in an exercise vehicle that is used out-of-doors whereby the additional benefit of fresh air is available.

Exercise vehicles of the nature indicated are known to the art. Reference may be made to U.S. Pat. No. 4,508,358 Erel, Apr. 2, 1985 and U.S. Pat. No. 3,760,905 Dower, Sept. 25, 1973. In the devices of each of these prior art patents rowing machine type exercising is achieved but the devices are relatively complicated and bulky. Accordingly it is a further object of the invention to provide an exercise vehicle of the nature indicated that is simple in form, easy to use and efficient in operation.

SUMMARY OF THE INVENTION

In carrying out the invention according to one form there is provided: an exercise vehicle comprising a framework, a rear axle attached to the framework, a pair of rear wheels operatively attached to the ends of the rear axle, one of the rear wheels being adapted to be driven by the rear axle, a front axle attached to the framework, a pair of front wheels operatively and steerably mounted on the ends of the front axle, and operator's seat mounted on the framework, an operators foot actuated member slidably mounted on the frame, a first one way clutch mounted on the rear axle, a first cable connecting the foot actuated member and the first one-way clutch whereby moving the foot actuated member moves the vehicle in a forward direction, an extensible steering column attached at its lower end to the framework adjacent the front axle, a rockable link connecting the extensible steering column at its upper end and the framework rearwardly of the front axle, a hand operated arm attached to the upper end of the steering column, a second one way clutch mounted on the rear axle and a second cable connecting the rockable link from adjacent the upper end of the steering column to the second one way clutch whereby moving the hand operated arm moves the vehicle in a forward direction.

According to another form, the exercise vehicle is provided wherein moving the foot actuated member comprises pushing and moving the hand operated arm comprises pulling.

BRIEF DESCRIPTION OF THE DRAWINGS

For a better understanding of the invention reference should now be made to the drawings in which.

DESCRIPTION OF THE PREFERRED EMBODIMENT

Figure 1:
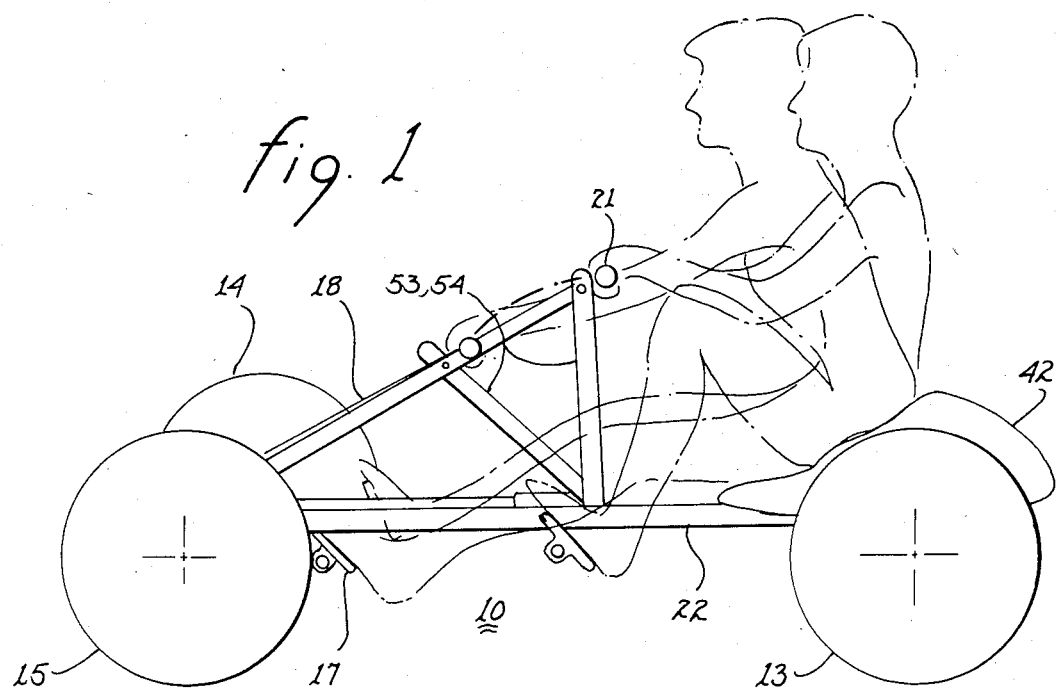
FIG. 1 is an outline of an exercise vehicle according to the invention, partially in perspective, illustrating a user operating the machine.

Referring to the drawings, the invention is shown embodied in an exercise vehicle 10 including a framework 11, a pair of rear wheels 12 and 13, a pair of front wheels 14 and 15, a foot propulsion system 16, a hand propulsion system 17, a steering column 18 and other components to be described. As can be visualized, the foot propulsion system 16 includes a foot operated bar 19 and the hand propulsion system 17 includes a hand operated bar 21 both bars to be moved back and forth for propelling the vehicle 10 forwardly.

The framework 11 may assume many forms and should be of relatively light weight. As shown, the framework consists of a series of tubes welded together. The framework 11 includes a longitudinal portion having two runs 22 and 23 connected by a bend 24. The forward ends of the runs 22 and 23 are welded to the front axle 25 which also may be a tube. At the rear of run 22 there is a U-shaped yoke 26, the legs of which are welded to the run 22. Similarly a U-shaped yoke 27 has its legs welded to the run 23.

The front axle 25 has wheel supports 28 and 29 of a usual type attached thereto from each of which extends a stub axle to which the front wheels 14 and 15 respectively are rotatably attached. The front wheel stub axles of course are vertically pivotable so that the wheels may be turned, as is well understood. Steering arms 31 and 32 are connected to the wheel supports 28 and 29, respectively, in the usual manner and are connected by a steering rod 33 at whose center an extending member 34 projects to which the steering column is attached for steering the vehicle as will become understood.

Figure 2:
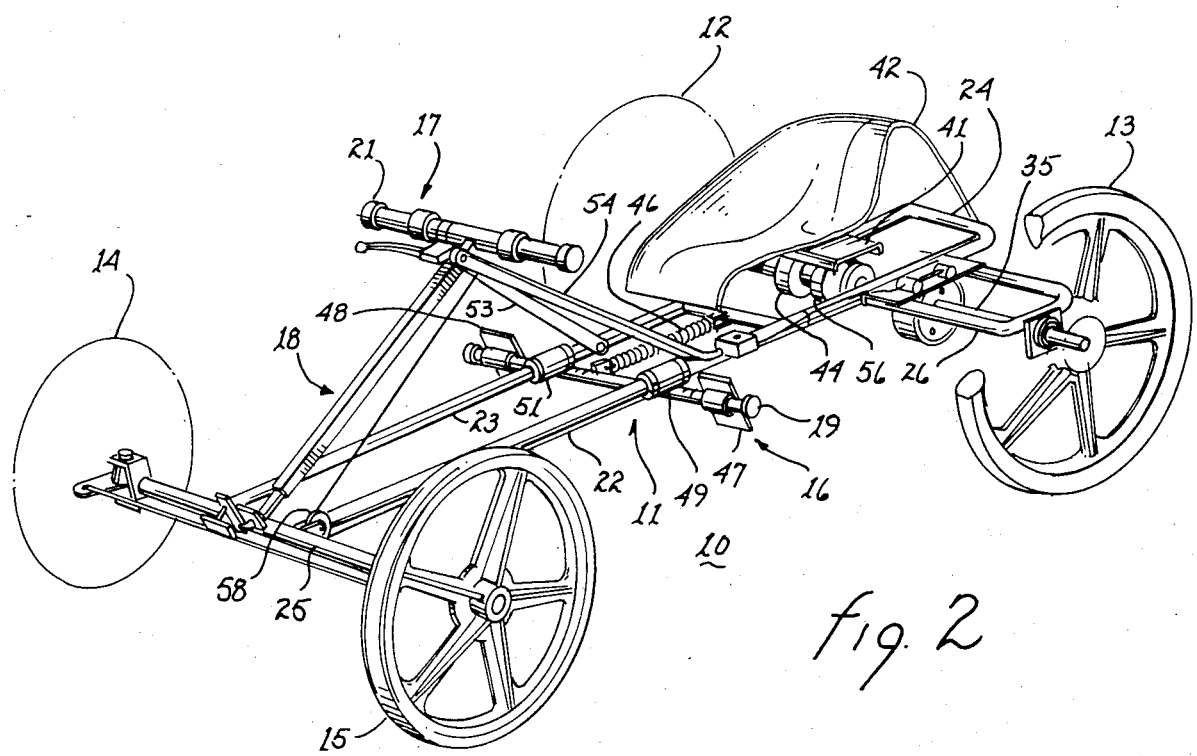
FIG. 2 is a perspective view, partially broken away, of the exercise vehicle illustrated in FIG. 1.

The rear axle 35 is attached to the rearward portion of the frame 11 and includes the pair of rear wheels 12 and 13 attached thereto. The right end of axle 35 may have wheel 12 connected thereto with an ordinary roller bearing so that the wheel 12 rolls freely with respect to the axle. On the other hand, the wheel 13 may be keyed (FIG. 2) to the left end of axle 35 so that the wheel 13 is driven. As a practical matter it is only necessary to drive one of the rear wheels and this results in a reduced amount of friction. The rear axle 35 may be attached to the frame by a series of bearings of which 36 and 37 are shown and may be roller bearings whose attaching plates are welded to the outward portions of the U-shaped yokes 26 and 37. In addition a further roller bearing 38 surrounding the right hand portion of the axle 37 has its attaching plate welded to the longitudinal run 23 of the framework. Attached to the longitudinal run 22 of the framework is the anti-backup block of a one-way clutch member 39 to be described further. The axle 37 is a one piece member as shown and may be retained in its transverse position by any well known mechanism which need not be further described.

Atop the longitudinal runs 22 and 23, essentially over the rear axle 35, is a horizontal platform 41 which may be welded to the runs 22 and 23. A seat 42 for the driver of the exercise vehicle may be held to the platform 41 in any suitable manner such as by rivets 43.

The foot propulsion system 16 includes the foot operated bar 19, a one-way clutch 44, a cable 45 and a foot bar retracting spring 46. The foot operated bar 19 which includes foot pedals 47 and 48 for engagement by an operator's feet is held by circular sleeves 49 and 51 around longitudinal runs 22 and 23 for reciprocating motion of the foot operated bar 19. Extending rearwardly from the foot operated bar 19 and attached thereto is the cable 45 whose other end is wrapped around the pulley portion of the one-way clutch 44. Thus when the operator moves the pedals 47 and 48 forwardly the cable 45 is pulled and the pulley portion 46 of the one-way clutch 44 rotates causing the one-way clutch through appropriate mechanism to drive the axle 37 in the forward direction. When the operator releases the pedals 47 and 48 or, alternatively, quits pushing thereon, the retracting spring 46 causes the foot operated bar 19 to move rearwardly thereby removing tension from the cable 45. At this point a wind-up spring 52 forming part of the one-way clutch mechanism causes the cable 45 to rewind on the pulley portion 46, as is well understood with one-way clutch mechanisms. Such mechanisms are only briefly described herein inasmuch as they are well known structures available on the open market and used in many similar situations. The wind up spring 52 structure is well known to most persons as being the kind of a structure utilized in connection with starting mechanisms for lawn mower engines. Thus it may be visualized that the operator of the vehicle pushes the pedals 47 and 48 forward causing the vehicle to move forwardly and when the pushing effort is released the wind up spring, etc. causes the cable 45 to be rewound, the one-way clutch mechanism permitting this reverse movement. At the same time it allows the cable 45 to move the pulley portion 46 when the one-way clutch grips the axle 37.

The hand propulsion system 17 includes the hand operated bar 21, a portion of the steering column 18, linkage members 53 and 54, a cable 55 and a one-way clutch mechanism 56 whose central member is attached to the axle 35. One end of the cable 55 is attached to the pulley portion 57 of the one-way clutch 56 and the other end of the cable 55 is attached to the upper end of the linkage members 53 and 54. As an operator pulls on the hand operated bar 21 (FIG. 1) the cable 55 is pulled toward the operator and causes the pulley portion 57 of the one-way clutch 56 to rotate in a forward direction, the one-way clutch engaging the axle 37 and causing the axle to rotate in the forward direction. The cable 55 is wrapped around a pulley 58 near the front axle 55 to provide the necessary guidance for the cable. When the operator ceases pulling on the arm 21 and tends to move his arms forwardly tension is removed from the cable 55 and a windup spring 59 causes the pulley portion 57 to reverse its direction (it being part of a one-way clutch) and causes the cable 25 to wind up on the pulley portion 57. The wind up spring 59 in this instance functions in the same manner as the wind up spring 52 already described. As the hand operating bar 21 is pulled toward the operator and released the hand operated bar moves in a slightly arcuate manner caused by the length of the linkage members 53 and 54 which are pivoted at their lower ends to the longitudinal runs 22 and 23. The upper ends of the linkage members 53 and 54 are pivoted at pivot 61 attached to a trunion 68 surrounding the upper end of the steering column 18.

Figure 4:
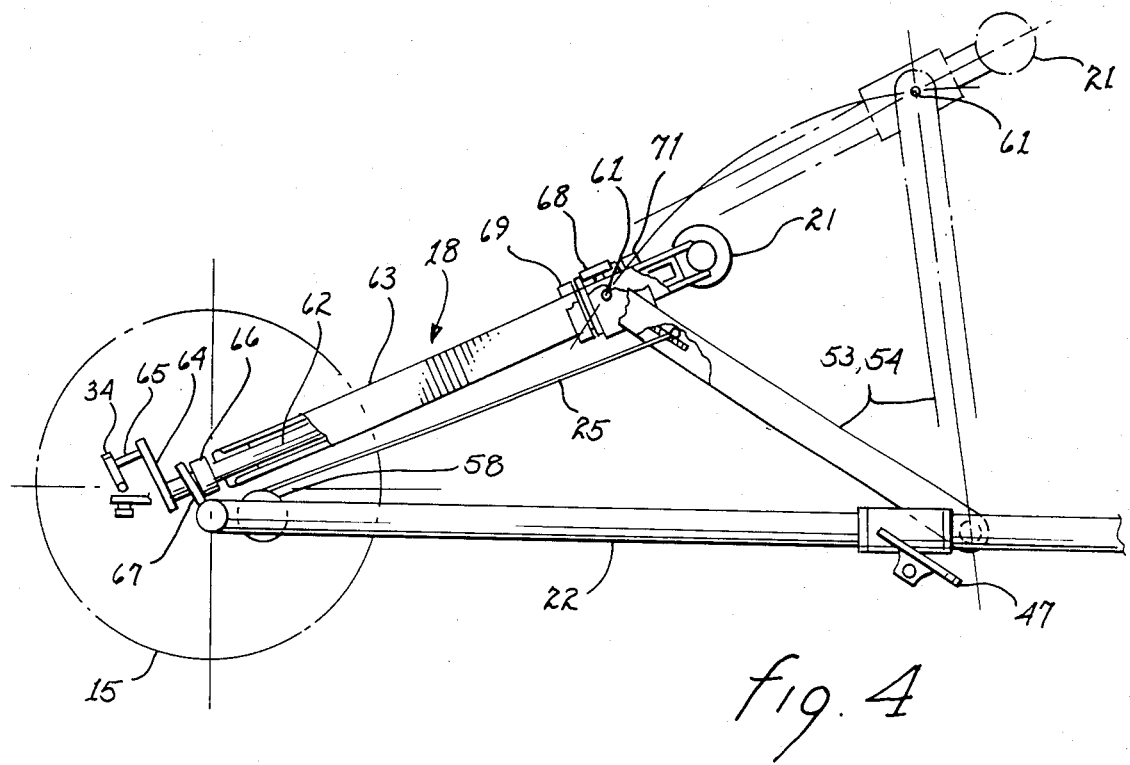
FIG. 4 is a fragmentary side view of the vehicle shown in FIG. 3.
Figure 5:
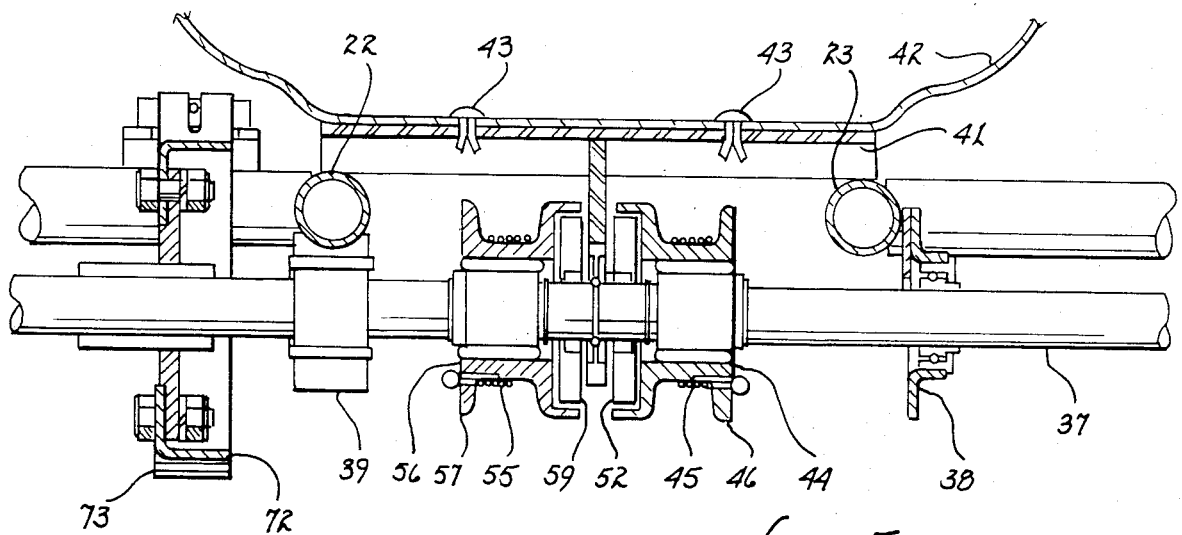
FIG. 5 is a fragmentary rear view, partially in section, taken substantially in the direction of the arrows 5—5 of FIG. 3.

Referring to FIG. 4 and noting that the hand operating arm 21 has two positions relatively far apart, it is evident that the steering column 18 must be extensible in order to accommodate the hand motions. This is achieved, according to the invention, by providing a steering bar 62 surrounded by a steering sleeve 63, the sleeve being slidable relatively to the bar 62 for whatever distance may be necessary. In the instance shown the steering bar 62 is square and the interior of the steering sleeve 63 also is square so that rotation of the sleeve causes the bar to rotate. This causes an arm 64 which is attached to the lower end of the bar 62 to rotate thereby causing the extending member 34 to move by means of the connecting pin 65. Movement of the extending member 34 causes the steering arm 33 to move and the front wheels 14 and 15 to turn in whatever direction is desired. A collar 66 attached to the lower end of the steering bar 62 prevents the bar from moving beyond the abutment 67 provided. At the upper end of the steering column 18 the hand operated bar 21 is attached in any suitable manner such as by welding to the steering sleeve 63. The trunion 68 to which the pivot pins 61 are attached surrounds the steering sleeve 63, collars 69 and 71 being provided on the sterring sleeve 63 to hold the trunion 68 in the position indicated. The vehicle is steered by rotating the arm 21.

In the event that the exercise cart has been driven uphill and one wants to stop without holding the cart in position by means of the hand operated bar or the foot operated bar, the further one-way clutch 39, as has been referred to, is attached to the axle 37 and to the longitudinal run 22. The one-way clutch 39 may be of the same form as the one-way clutches 44 and 56 but is connected to the axle and to the run 42 in the reverse direction. Thus clutch 39 permits forward motion of the axle 37 but prevents rearward motion thereof. This clutch, as the others, includes an external member, an internal hub and rollers grippers in between as is well understood.

Figure 3:
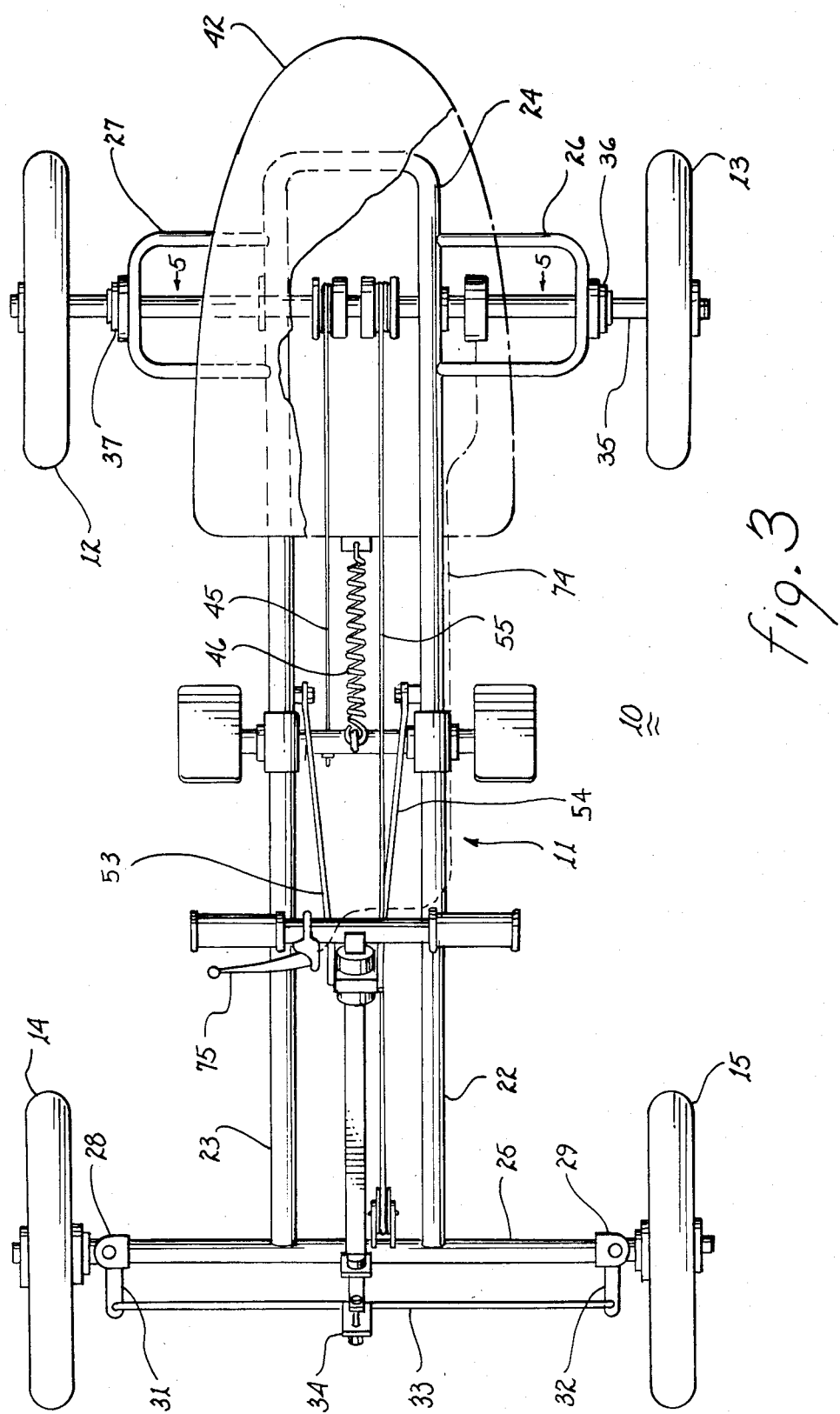
FIG. 3 is a planned view, partially broken away, of an exercise vehicle according to the invention on a somewhat larger scale.

In addition, a brake member including a drum 72 is attached to the rear axle 37. A brake band 73 is associated with the exterior surface of the drum and has a cable 74 (shown dotted in FIG. 3) connected to it. Ultimately cable 74 is connected to a brake handle 75 pivotally attached to the operating arm 21. By pulling on the brake handle 75 the operator applies tension to the cable 74 and thus applies the brake to the vehicle for stopping purposes.

In FIG. 1 an operator is shown with his feet in two positions. Likewise his hands, arms and upper body are shown in two positions as would be the case pulling with his hands in a power stroke and releasing for a new stroke. The feet move forwardly for a power stroke and retract for a new stroke.

It will be evident that an exercise vehicle operator sitting on the seat 42 and pushing with his feet can cause the vehicle to move forward. Similarly by pulling with his hands the operator can cause the vehicle to move forward. Both pushing with the feet and pulling with the hands can be carried on at the same time or alternatively as desired. Pushing as well as pulling on the hand bar may be effected if desired.

I claim:

1. An exercise vehicle comprising a framework, a rear axle attached to said framework, a pair of rear wheels operatively attached to the ends of said rear axle, one of said rear wheels being driven by said rear axle, a front axle supported by said framework, a pair of front wheels operatively and steerably mounted on the ends of said front axle, an operator's seat mounted on said framework, an operator's foot actuated member slidably mounted on said framework, a first one-way clutch mounted on said rear axle, a first cable connecting said foot actuating member and said first one-way clutch, whereby moving said foot actuating member moves said vehicle in a forward direction, an extensible steering column pivotally attached at its lower end to said framework adjacent said front axle, a rigid rockable link connecting said extensible steering column at its upper end to said framework rearwardly of said front axle, a hand operated arm attached to the upper end of said steering column, a second one way clutch mounted on said rear axle, and a second cable connecting said rockable link from adjacent said upper end of the steering column to said second one-way clutch whereby moving said hand operated arm moves said vehicle in a forward direction indpendently of said foot actuated member.

2. The exercise vehicle according to claim 1 wherein moving said foot actuated member comprises pushing and moving said hand operated arm comprises pulling.

3. The exercise vehicle according to claim 2 wherein said first and second one-way clutches include spring actuated return devices for rewinding said first and second cables on reversing said pushing and pulling.

4. The exercise vehicle according to claim 2 including a third one-way clutch reversely connected to said rear axle for preventing rearward motion of said vehicle.

5. The exercise vehicle according to claim 4 including a brake mounted on said rear axle, a brake operating mechanism mounted on said steering column and a third cable connecting said brake and said brake operating mechanism.

6. The exercise vehicle according to claim 2 wherein the steerable mounting of said front wheels includes an individually pivoted steering axle for each front wheel, and a steering arm connected from the lower end of said steering column to said pivoted steering axles.

7. The exercise vehicle according to claim 6 wherein said extensible steering column comprises a bar linked to said steering arm, a sleeve surrounding said bar slidable relative thereto and attached to the upper end of said rockable link and to said hand operating arm, said sleeve being adapted to rotate said bar.

8. The exercise vehicle according to claim 7 wherein said bar and said sleeve have a square section.

* * * * *